No. 678,912. Patented July 23, 1901.
F. E. & F. O. STANLEY.
STEAM GENERATING APPARATUS.
(Application filed Feb. 17, 1900.)
(No Model.)

Witnesses:
H. B. Davis.
J. L. Hutchinson.

Inventors:
Francis E. Stanley
Freelan O. Stanley
by B. J. Noyes atty

THE NORRIS PETERS CO., PHOTO-LITHO., WASHINGTON, D. C.

UNITED STATES PATENT OFFICE.

FRANCIS E. STANLEY AND FREELAN O. STANLEY, OF NEWTON, MASSACHUSETTS.

STEAM-GENERATING APPARATUS.

SPECIFICATION forming part of Letters Patent No. 678,912, dated July 23, 1901.

Application filed February 17, 1900. Serial No. 5,607. (No model.)

*To all whom it may concern:*

Be it known that we, FRANCIS E. STANLEY and FREELAN O. STANLEY, of Newton, county of Middlesex, and State of Massachusetts, have invented an Improvement in Steam-Generating Apparatus, of which the following description, in connection with the accompanying drawings, is a specification, like letters on the drawings representing like parts.

This invention has for its object to improve and simplify the construction of steam-generators, whereby they may be operated with greater safety by unskilled persons, thus adapting them for use particularly on motor-carriages.

In accordance with this invention a group or set of flashing-tubes are placed in direct contact with a heating medium, which may be a mineral oil, which is contained in a suitable receiver—as, for instance, said tubes may be submerged in said heating medium—and means are provided for heating said heating medium to any required temperature in order that it shall serve as an interposed or indirect means of heating the flashing-tubes, and means are also provided for controlling the temperature of said heating medium, so that the flashing-tubes may in turn be heated to any desired temperature. Means are also provided for supplying the flashing-tubes with water at a constant predetermined pressure, and a controlling device is employed for regulating the quantity of water supplied, so that any desired quantity of water may be delivered to the flashing-tubes at a constant predetermined pressure corresponding to the required output of the engine. As the water is delivered to the flashing-tubes it is flashed into steam at a temperature corresponding to the temperature of the heating medium. Therefore it will be understood that the temperature of the steam generated has no corresponding relation to the pressure, as is usual in steam-boilers, which is due to providing means having for its sole object the delivery of the water to the flashing-tubes at a constant predetermined pressure and absolutely independent means having for its sole object the regulation of the temperature of the steam generated. Means are also provided for relieving the pressure at a predetermined point. Such a steam-generator cannot be overheated, because the temperature of the heating medium is controlled, and the steam-pressure cannot be raised to a point of danger, because the pressure is relieved.

Figure 1:
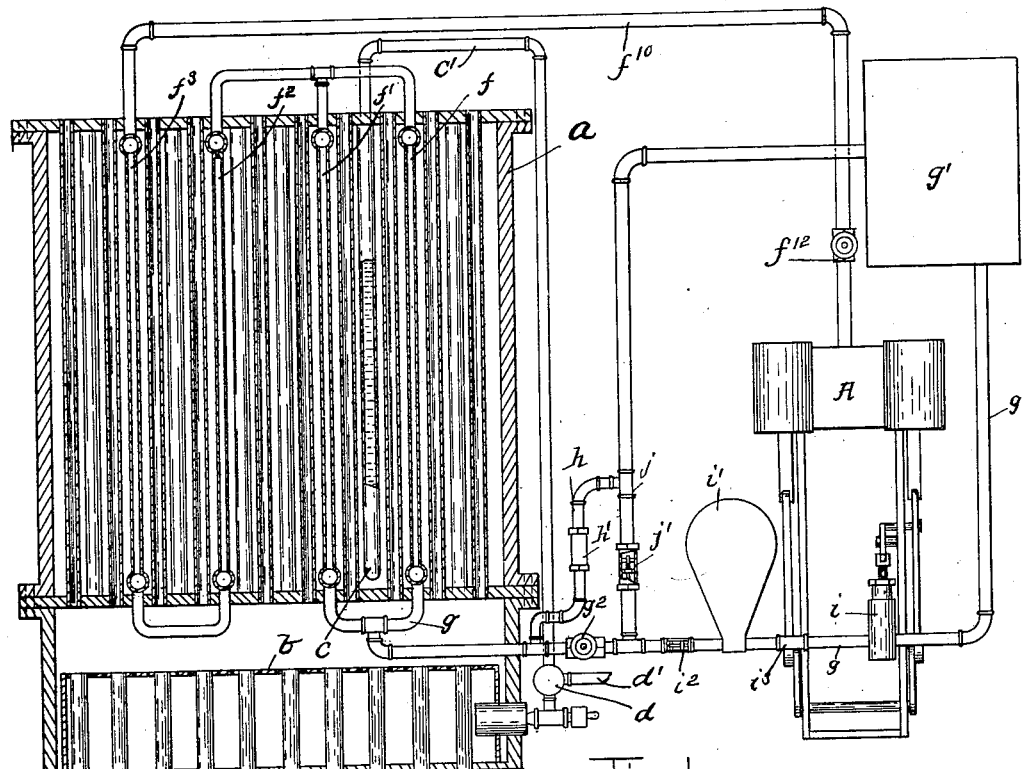
Figure 2:
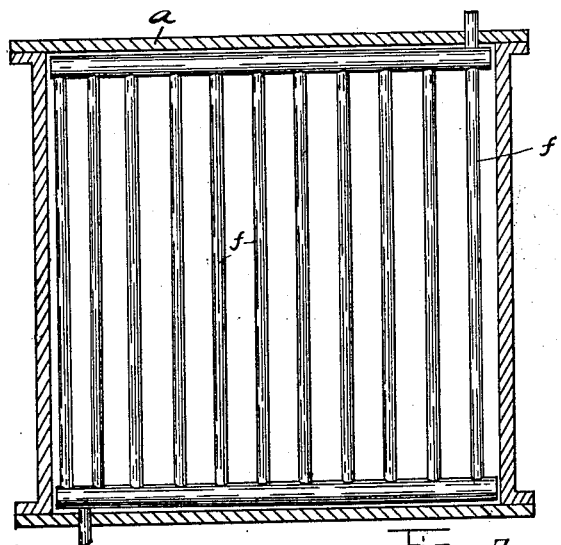
Figure 3:
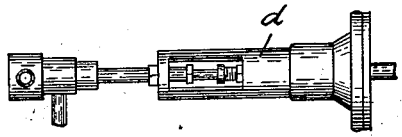

Figure 1 shows in vertical section and partial elevation a steam-generator embodying this invention. Fig. 2 is a detail showing a group or set of flashing-tubes contained in a receiver which contains the heating medium, said tubes being in direct contact with said heating medium. Fig. 3 is a detail of an automatic valve which forms a coöperative part of the thermal device by which the temperature of the heating medium is regulated.

$a$ represents a receiver, which is herein represented as a cylinder having heads or ends to which a number of fire-flues are secured, yet said receiver $a$ may be constructed in any other suitable manner, and $b$ represents a burner, which is located beneath said receiver $a$, which may be of any usual or suitable construction adapted for burning hydrocarbon.

The receiver $a$ contains a heating medium—such, for instance, as a quantity of mineral oil—and said heating medium is adapted to be heated by the burner $b$ to any required temperature. The receiver $a$ is herein represented as closed. As a means of controlling the temperature of the heating medium we have provided a thermal controlling device, which is herein shown as a tube $c$, projecting down into the receiver and having its lower end closed and having its upper end in open communication with a pipe $c'$, which is connected to an automatic valve $d$, which is included in or connected with a supply-pipe $d'$ for the burner. The tube $c$ is submerged in the heating medium which is contained in the receiver $a$ and being thus disposed in contact with said heating medium will be heated by it. The automatic valve consists, essentially, of a valve-plug $e$, which coöperates with a suitable valve-seat and which is operated by a suitable diaphragm contained in the case, said diaphragm being operated by expansion of any material which is contained in the tube $c$ and pipe $c'$. Such an automatic valve is well known and is now in common use in connection with other devices. As the temperature of the heating medium rises the valve will be closed more or less, so that the supply of hydrocarbon to the burner will be correspondingly reduced, and vice versa.

Flashing-tubes are contained in the receiver $a$, in which the water is flashed into steam, and said tubes are disposed in direct contact with the heating medium contained in said receiver, and while these tubes may be constructed and arranged in many different ways we have herein shown one simple form for the purpose of illustrating this part of our invention.

As herein shown, four sets or groups of flashing-tubes $f$ $f'$ $f^2$ $f^3$ are disposed vertically in the receiver, and the several sets of flashing-tubes are made substantially alike, and each set consists of an upper and a lower horizontal tube of large diameter connected together by a number of vertical tubes of small diameter.

The several groups or sets of flashing-tubes may be connected together in parallel or in series, or both, as may be deemed best; but, as herein shown, the two groups or sets $f$ $f'$ are connected together and to the pipes leading to and from them in parallel and the two groups or sets $f^2$ $f^3$ are connected together and to the pipes leading to and from them in series. When connected as herein shown, an unobstructed passage is provided up the two groups or sets $f$ $f'$, then down through the group or set $f^2$, and then up through the group or set $f^3$. A supply-pipe $g$ is connected with the lower ends of the groups or sets $f$ $f'$, by which water is delivered thereto, and a pipe $f^{10}$ leads from the upper end of the group or set $f^3$ to the engine A, which latter may be of any common type so far as this invention is concerned and is therefore herein illustrated only in diagram. The pipe $g$ leads to a water-supply tank $g'$ and has a controlling or regulating valve $g^2$, by which the quantity of water delivered to the flashing-tubes is governed. This valve in reality constitutes the throttle-valve of the steam-generating apparatus. Back of this regulating-valve $g^2$ or between it and the water-supply tank $g'$ we have provided means for supplying the water to the flashing-tubes at a constant predetermined pressure—i. e., any pressure that may be determined upon by the user—and while many different devices may be provided for accomplishing this result we have herein shown one simple form for the purpose of illustrating this invention.

$i$ represents a pump of common type, and $i'$ the usual air-compressing drum, and said pump and drum are connected with the supply-pipe $g$, and suitable check-valves $i^2$ $i^3$ are provided one at each side of said drum.

The pump $i$ is adapted to be operated by the engine A in any usual or suitable manner, so as to operate continuously while the engine is running to pump the water into the drum $i'$ under pressure.

$j$ represents a pipe leading from the pipe $g$ at a point between the regulating-valve $g^2$ and the check-valve $i^2$ beside the drum, and said pipe $j$ returns to the water-supply tank $g'$, and said pipe $j$ has a valve $j'$, constructed as an ordinary relief-valve, which is adapted to be set to relieve at any desired pressure. Assuming that the constant pressure required for the water is to be one hundred and twenty pounds, the relief-valve $j'$ will be set to relieve at such pressure, and as the pump operates the pressure will be raised in the drum to one hundred and twenty pounds and maintained at such point, as above such point the relief-valve operates and returns the excess water to the tank.

The pipe $f^{10}$, leading from the flashing-tubes to the engine, has a controlling-valve $f^{12}$, which may be closed whenever desired, and it is desirable to provide a valve at this point, so that on starting the generator any water which may be contained in the flashing-tubes will not when generated into steam start the engine, yet it is the intention to keep said valve $f^{12}$ open at all other times. To provide against raising the pressure in the flashing-tubes to a point of danger, particularly in case said valve $f^{12}$ should be closed, we have provided a pipe $h$, which connects the pipe $g$ with the pipe $j$, and said pipe $h$ has a relief-valve $h'$, adapted to operate to relieve the pressure. Thus it will be seen that the water will be delivered to the flashing-tubes at a constant predetermined pressure and that the quantity of water delivered may be regulated as desired and also that the temperature of the steam generated has no corresponding relation to the pressure.

In addition to the many advantages heretofore set forth the steam-generator embodying this invention is especially adapted for motor-carriages for the reason that on starting the carriage there is no reserve steam under high pressure to operate quickly and start the carriage without jerk, yet there is ample reserve energy in the heating medium to accomplish the desired ends.

We claim—

In a steam-generator, the combination of a receiver containing a heating medium, means for heating the same, flashing-tubes contained in said receiver in contact with said heating medium, a supply-pipe connected with said flashing-tubes, a pump connected with said supply-pipe, means for operating it, a drum also connected with said supply-pipe into which the water is forced by said pump, a check-valve, a relief-valve and connections whereby the water is maintained in the drum at a constant predetermined pressure, and a regulating-valve in said supply-pipe for regulating the quantity of water delivered under pressure to said flashing-tubes, substantially as described.

In testimony whereof we have signed our names to this specification in the presence of two subscribing witnesses.

FRANCIS E. STANLEY.
FREELAN O. STANLEY.

Witnesses:
BERNICE J. NOYES,
JENNIE L. HUTCHINSON.